United States Patent
Stenfort et al.

(10) Patent No.: US 7,373,541 B1
(45) Date of Patent: May 13, 2008

(54) ALIGNMENT SIGNAL CONTROL APPARATUS AND METHOD FOR OPERATING THE SAME

(75) Inventors: Ross Stenfort, San Jose, CA (US); John Packer, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 377 days.

(21) Appl. No.: 10/800,048

(22) Filed: Mar. 11, 2004

(51) Int. Cl.
*G06F 1/14* (2006.01)

(52) U.S. Cl. ............................. 713/503; 713/400

(58) Field of Classification Search ............ 713/503
See application file for complete search history.

(56) References Cited

U.S. PATENT DOCUMENTS

| | | | |
|---|---|---|---|
| 6,480,593 B1 * | 11/2002 | Munday et al. | 379/221.02 |
| 2004/0019432 A1 * | 1/2004 | Sawafta et al. | 702/19 |
| 2004/0120353 A1 * | 6/2004 | Kim et al. | 370/503 |
| 2004/0137952 A1 * | 7/2004 | Umesh et al. | 455/562.1 |
| 2005/0089012 A1 * | 4/2005 | Martin et al. | 370/351 |
| 2005/0188123 A1 * | 8/2005 | Chen | 710/33 |
| 2006/0117189 A1 * | 6/2006 | Chiu et al. | 713/189 |

OTHER PUBLICATIONS

ISCSI specification, retrieved from http://tools.ietf.org/html/draft-ietf-ips-iscsi-20, retrieved on Sep. 21, 2007.*

* cited by examiner

*Primary Examiner*—James K. Trujillo
*Assistant Examiner*—Fahmida Rahman
(74) *Attorney, Agent, or Firm*—Martine Penilla & Gencarella, LLP

(57) ABSTRACT

Broadly speaking, an apparatus and associated method of operation is provided for controlling alignment signal transmission in an electronic communication process. More specifically, a programmable control is provided for controlling transmission of alignment signals in either a Serial Attached SCSI (SAS) or Serial ATA (SATA) communication process. The programmable control includes a counter operated to sequentially modify a count value. When the count value is equal to a programmed alignment trigger value, the programmable control is configured to generate and transmit an alignment signal through the initiator transceiver to the target transceiver. Thus, the apparatus and associated method of operation controls a rate at which alignment signals are transmitted in a SAS/SATA communication process.

18 Claims, 4 Drawing Sheets

ALIGNMENT SIGNAL CONTROL APPARATUS AND METHOD FOR OPERATING THE SAME

BACKGROUND OF THE INVENTION

1. Field of the Invention

The present invention relates generally to electronic device communication.

2. Description of the Related Art

Modern computing systems generally include a number of devices in communication with each other. For example, one device may be a host computer and another device may be a hard drive connected as a peripheral device. Communication (i.e., data transfer) protocols are used to enable communication between the devices. In addition, standard communication protocols have been developed to ensure communication compatibility between various devices. The standard communication protocols provide rigid frameworks and processes for conducting data transfers between devices.

For example, the standard communication protocols provide clock frequency tolerances and clock skew management requirements for devices involved in the communication process. The clock frequency tolerances and clock skew management requirements are intended to prevent compliant devices from experiencing overrun conditions during the communication process. However, devices involved in the communication process may not always be fully compliant with the governing communication protocol, particularly in an area as sensitive as clock signal behavior. Unfortunately, since the standard communication protocols are quite rigid with respect to clock skew management requirements, devices that are intended to operate in conjunction with the standard communication protocol but fail to comply with the clock frequency tolerances are subject to overrun conditions.

In view of the foregoing, a solution is needed to allow for flexibility in clock skew management between devices in a communication process, wherein the communication process is otherwise governed by a standard communication protocol.

SUMMARY OF THE INVENTION

Broadly speaking, the present invention provides an apparatus and associated method of operation for controlling a rate at which alignment signals are transmitted in an electronic communication process. More specifically, in the present invention a programmable control is used to control transmission of alignment signals in either a Serial Attached SCSI (SAS) or Serial ATA (SATA) communication process. The programmable control includes a free-running counter. When the free-running counter reaches a programmed alignment trigger value, the programmable control is configured to generate and transmit an alignment signal through the initiator transceiver to the target transceiver. Thus, the present invention provides an apparatus and method for controlling a rate at which alignment signals are transmitted in a SAS/SATA communication process. Furthermore, in one embodiment, the alignment trigger value used to control the rate at which alignment signals are transmitted can be selected through a user interface. Additionally, the present invention provides for selecting an alignment trigger value that is capable of adequately compensating for a clock skew condition existing between the initiator and target transceivers.

In one embodiment, an apparatus for controlling an alignment signal transmission in an electronic communication process is disclosed. The apparatus includes a counter configured to sequentially modify a count value in accordance with an associated clock signal. The apparatus also includes a storage cell configured to receive and store an alignment trigger value. A comparator is connected to receive the count value as an input from the counter and the alignment trigger value as an input from the storage cell. The comparator is configured to compare the input from the counter to the input from the storage cell. Also, the comparator is configured to send an output signal from an output port when the inputs from the counter and the storage cell are equivalent. The apparatus further includes alignment circuitry connected to receive the output signal from the comparator. In response to receipt of the output signal from the comparator, the alignment circuitry is configured to generate an alignment signal and transmit the alignment signal through the initiator transceiver to the target transceiver.

In another embodiment, a method for controlling alignment signal transmission in an electronic communication process is disclosed. The method includes selecting an alignment trigger value. The method also includes operating a counter to sequentially modify a count value in accordance with an associated clock signal. The method further includes transmitting an alignment signal in place of a transmission unit when the count value is equal to the alignment trigger value.

In another embodiment, a computer readable media containing program instructions for controlling alignment signal transmission in an electronic communication process is disclosed. The computer readable media includes program instructions for selecting an alignment trigger value. Program instructions are also provided for sequentially modifying a count value. Program instructions are further provided for transmitting an alignment signal in place of a transmission unit when the count value is equal to the alignment trigger value.

Other aspects of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

Broadly speaking, the present invention provides an apparatus and associated method of operation for controlling a rate at which alignment signals are transmitted in an electronic communication process. More specifically, in the present invention a programmable control is used to control transmission of alignment signals in either a Serial Attached SCSI (SAS) or Serial ATA (SATA) communication process. The programmable control includes a free-running counter. When the free-running counter reaches a programmed alignment trigger value, the programmable control is configured to generate and transmit an alignment signal through the initiator transceiver to the target transceiver. Thus, the present invention provides an apparatus and method for controlling a rate at which alignment signals are transmitted in a SAS/SATA communication process. Furthermore, in one embodiment, the alignment trigger value used to control the rate at which alignment signals are transmitted can be selected through a user interface. Additionally, the present invention provides for selecting an alignment trigger value that is capable of adequately compensating for a clock skew condition existing between the initiator and target transceivers.

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
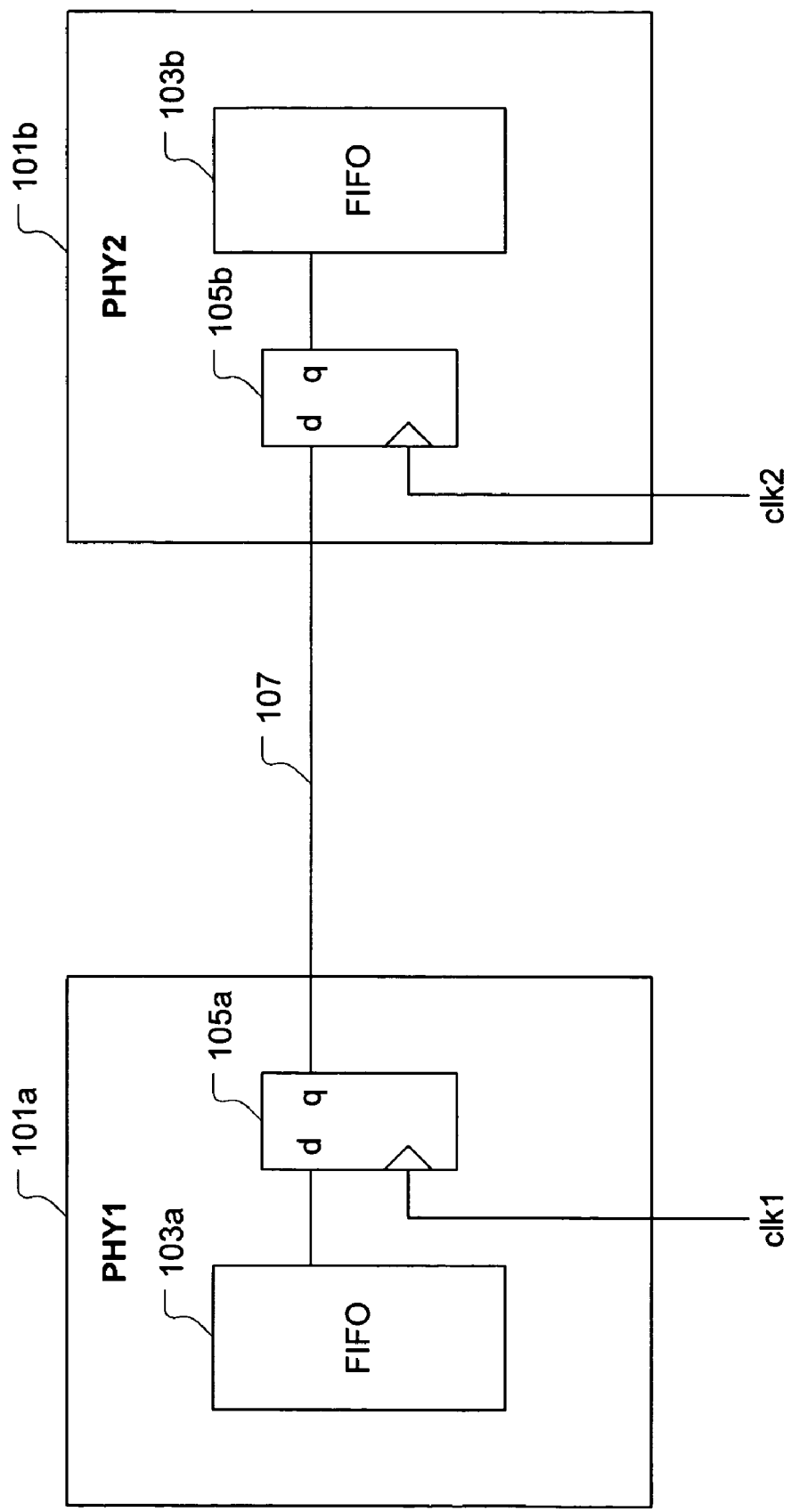
FIG. 1 is an illustration showing a device configuration for performing an electronic communication process, in accordance with one embodiment of the present invention.

FIG. 1 is an illustration showing a device configuration for performing an electronic communication process, in accordance with one embodiment of the present invention. The device configuration includes a first phy 101a and a second phy 101b. Each of the first phy 101a and the second phy 101b represents a transceiver defined to transmit and receive communication signals. Each of the first phy 101a and the second phy 101b includes a storage buffer 103a and 103b, respectively. In one embodiment, the storage buffers 103a and 103b are defined as first-in-first-out (FIFO) type buffers. It should be appreciated, however, that other types of storage buffers can also be used in conjunction with the present invention. Each of the first phy 101a and the second phy 101b also includes a data latch 105a and 105b, respectively.

During the communication process, data is transmitted from the FIFO 103a to the data latch 105a in accordance with a clock signal (clk1). The data is then transmitted from the data latch 105a of the first phy 101a through a link 107 to the data latch 105b of the second phy 101b, in accordance with the clock signal (clk1). The data is received into the data latch 105b of the second phy 101b in accordance with a clock signal (clk2). Then, the data is transmitted from the data latch 105b to the FIFO 103b, in accordance with the clock signal (clk2).

Ideally, the clock signals (clk1) and (clk2) are defined to be substantially similar. However, due to manufacturing tolerances and other latencies within the clock circuitry, a clock skew can exist between the clock signals (clk1) and (clk2). In one example, the clock skew can be represented as the clock signal (clk1) being slightly faster than the clock signal (clk2). In the present example, if over time the clock skew is not corrected, the second phy 101b may receive data over the link 107, but be unable to process the data through the data latch 105b. Thus, in the present example, an overrun condition will occur.

The SAS and SATA specifications include phy clock frequency tolerance requirements to limit an amount of clock skew that is allowed to exist between SAS/SATA compatible devices. Additionally, the SAS and SATA specifications include clock skew management requirements. More specifically, the SAS specification requires a phy that is acting as an original source of a data transmission to insert one alignment signal within every 2048 transmitted dwords. The SATA specification requires a phy that is acting as an original source of a data transmission to insert two alignment signals within every 256 transmitted dwords. In the present discussion a dword represents a sequence of four contiguous bytes or four contiguous characters considered as a unit. A data transmission of dwords is referred to as a dword stream. Also, in the present discussion, an alignment signal in SAS and SATA represents a dword that is ignored by internal logic of the receiver. In SAS and SATA, the alignment signal can be represented as either of the following primitives: ALIGN(0), ALIGN(1), ALIGN(2), ALIGN(3), NOTIFY(ENABLE SPINUP), NOTIFY(RESERVED 0), NOTIFY(RESERVED 1), NOTIFY (RESERVED 2).

Insertion of alignment signals in the dword stream, as required by the SAS and SATA specifications for clock skew management, serves to delay transmission of dword stream content that must be processed by the internal logic of the receiver. Therefore, insertion of alignment signals effectively allows the receiver to catch up with processing of received dwords in order to provide buffer space for receipt of subsequent incoming dwords, thus avoiding an overrun condition. The clock skew management requirements of the SAS and SATA specifications are intended to prevent occurrence of an overrun in devices that comply with the SAS and SATA clock frequency tolerance requirements, respectively. However, compliance with the SAS/SATA clock skew management requirements may not be sufficient for devices that operate outside of the associated clock frequency tolerance requirements. The present invention provides an apparatus and associated method of operation that allows for flexible and programmable clock skew management beyond the rigid requirements of the SAS and SATA specifications.

Figure 2:
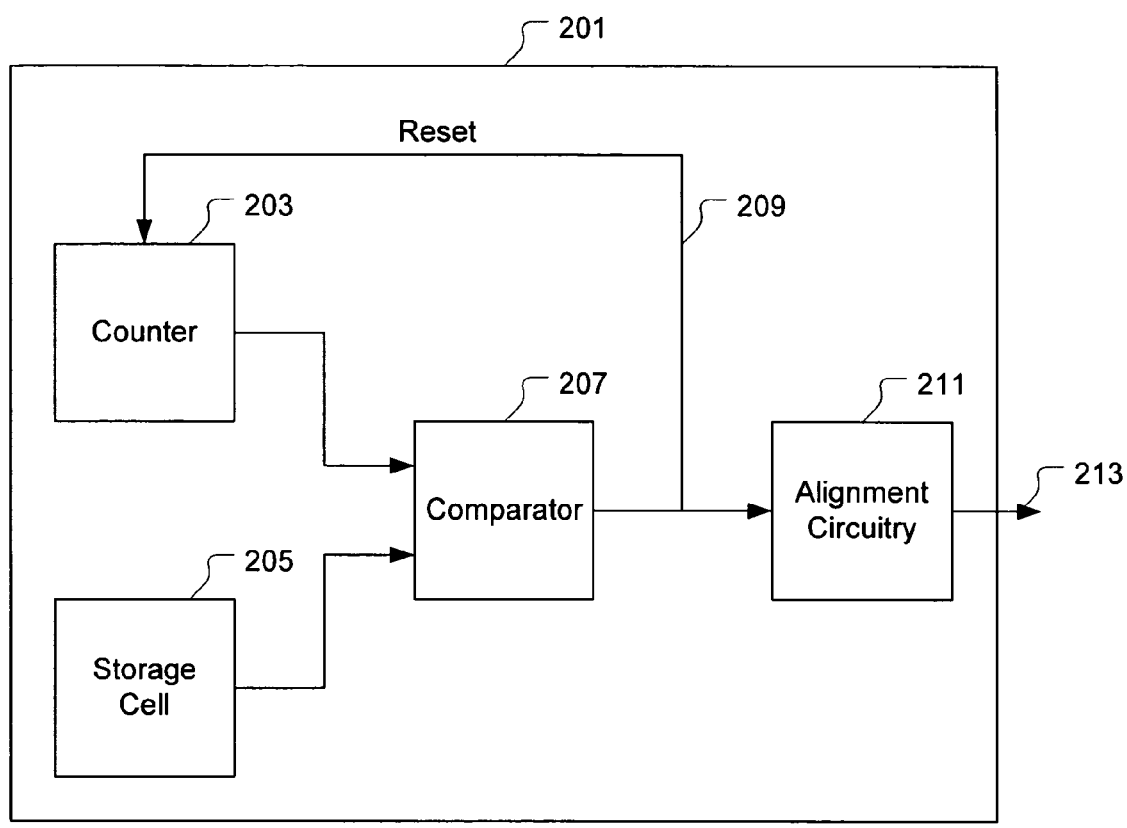
FIG. 2 is an illustration showing a block diagram of a clock skew management module, in accordance with one embodiment of the present invention.

FIG. 2 is an illustration showing a block diagram of a clock skew management module 201, in accordance with one embodiment of the present invention. The clock skew management module 201 represents a programmable control capable of controlling transmission of alignment signals in either the SAS or SATA communication process. The clock skew management module 201 includes a counter 203 and a storage cell 205 connected to each provide an input to a comparator 207. The counter 203 is configured to sequentially modify a count value in accordance with an associated clock signal. In one embodiment, the associated clock signal is equivalent to a clock signal used to operate a phy acting as an original source of a dword stream. In various embodiments, the sequential modification of the count value by the counter can be implemented to either increment or decrement the count value. The storage cell 205 is configured to receive and store an alignment trigger value. In one embodiment, a user interface is provided to enable setting of the alignment trigger value in the storage cell 205. It should be appreciated that the alignment trigger value can be set to any integer value.

The comparator 207 is configured to compare the inputs received from the counter 203 and the storage cell 205. Upon equivalence of the input from the counter 203 and the input from the storage cell 205, the comparator is configured to transmit an output signal from an output port to alignment circuitry 211. In response to receipt of the output signal from the comparator 207, the alignment circuitry 211 is configured to generate an alignment signal and transmit the alignment signal through an output connection 213. The alignment signal is transmitted from the clock skew management module 201 through the initiator phy to the target phy. Therefore, the alignment trigger value serves to define a number of dwords to be transmitted between each alignment signal transmission from the initiator phy to the target phy.

The clock skew management module 201 also includes a reset link 209 defined to transmit the output signal from the comparator 207 to a reset port of the counter 203. Upon receipt of the output signal at the reset port, the counter 203 is configured to restart a counting operation. To compensate for a latency associated with resetting the counter 203, the alignment circuitry includes a delay circuit defined to delay transmission of the alignment signal, thus allowing the counter 203 to be reset to continue counting from an initial value upon transmission of the alignment signal from the clock skew management module 201.

Figure 3:
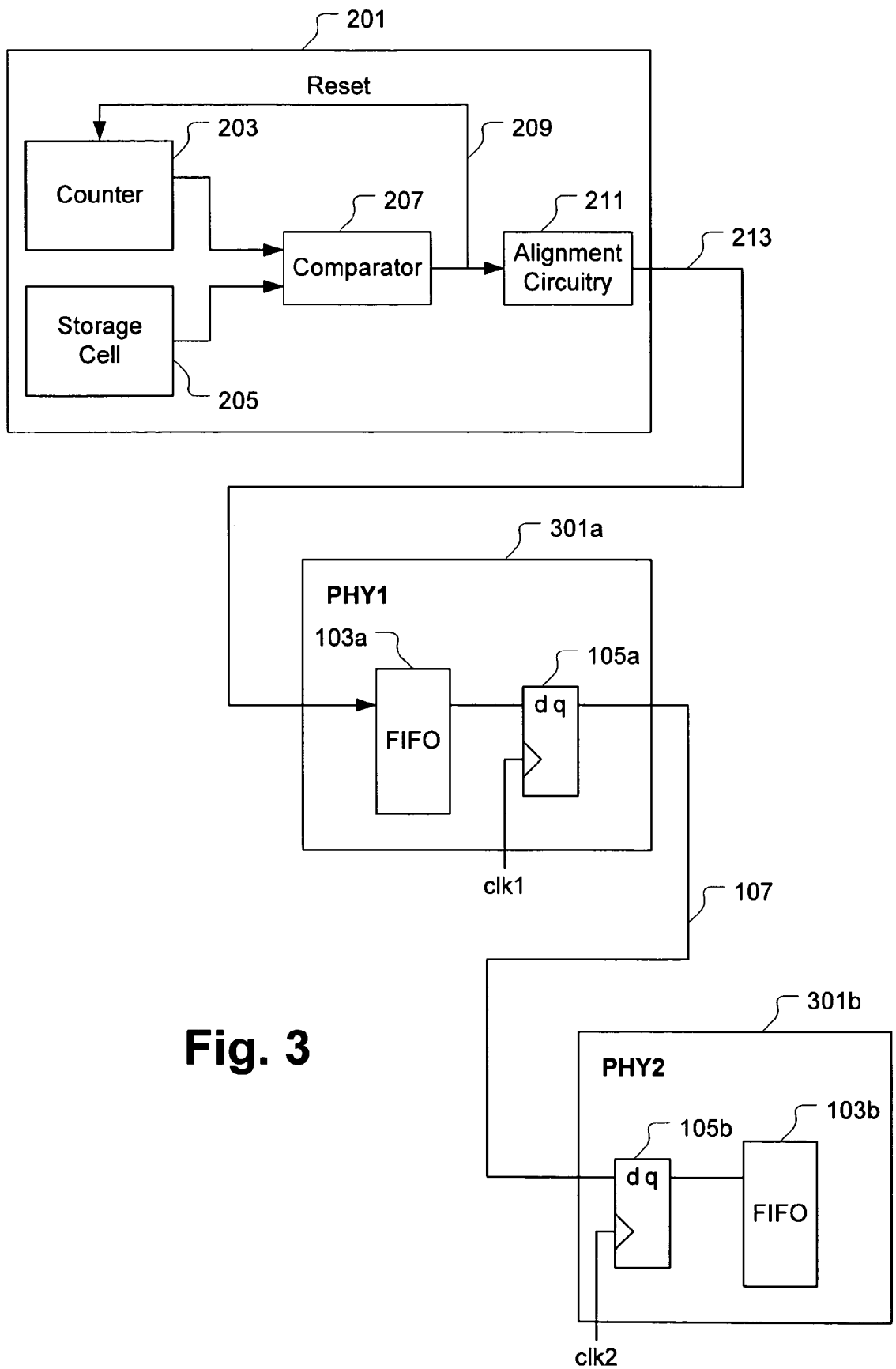
FIG. 3 is an illustration showing the clock skew management module connected to control a rate of alignment signal transmission between an initiator phy and a target phy, in accordance with one embodiment of the present invention.

FIG. 3 is an illustration showing the clock skew management module 201 connected to control a rate of alignment signal transmission between an initiator phy 301a and a target phy 301b, in accordance with one embodiment of the present invention. The initiator phy 301a and the target phy 301b are analogous to the first phy 101a and the second phy 101b, respectively, as previously described with respect to FIG. 1. The output connection 213 of the clock skew management module 201 is connected to the initiator phy 301a such that an alignment signal transmitted from the clock skew management module will be received into the FIFO 103a of the initiator phy 301a. Once received into the FIFO 103a, the alignment signal is propagated through the initiator phy 301a to the target phy 301b. Therefore, the clock skew management module 201 is connected to ensure that the rate of alignment signal transmission between the initiator phy 301a and the target phy 301b complies with the alignment trigger value stored in the storage cell 205.

Figure 4:
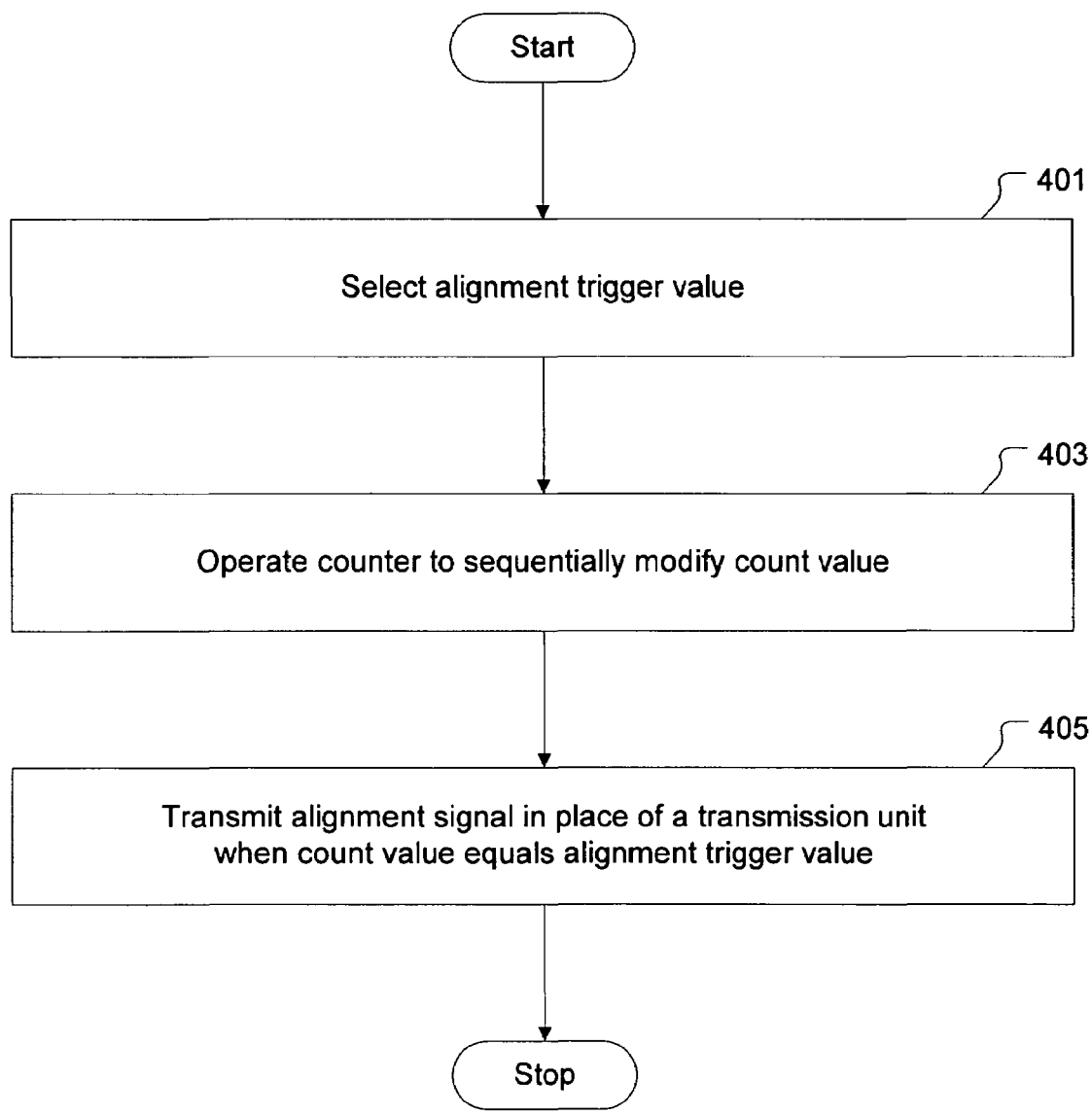
FIG. 4 is an illustration showing a flowchart of a method for controlling alignment signal transmission in an electronic communication process between an initiator transceiver and a target transceiver, in accordance with one embodiment of the present invention.

FIG. 4 is an illustration showing a flowchart of a method for controlling alignment signal transmission in an electronic communication process between an initiator transceiver and a target transceiver, in accordance with one embodiment of the present invention. In various embodiments, the electronic communication process can be performed in accordance with either the SAS or SATA communication protocol, wherein the alignment signal can be represented as either of the following primitives: ALIGN(0), ALIGN(1), ALIGN(2), ALIGN(3), NOTIFY(ENABLE SPINUP), NOTIFY(RESERVED 0), NOTIFY(RESERVED 1), NOTIFY (RESERVED 2). In both the SAS and SATA embodiments, a transmission unit is represented as a dword, and each of the initiator transceiver and the target transceiver is represented as a phy.

The method of FIG. 4 includes an operation 401 in which an alignment trigger value is selected. It should be appreciated that the alignment trigger value can be any value necessary to ensure compatibility between the initiator transceiver and the target transceiver. In one embodiment, the method includes providing a user interface to enable selection of the alignment trigger value. In an operation 403, a counter is operated to sequentially modify a count value in accordance with an associated clock signal. In one embodiment, sequential modification of the count value in defined as incrementing the count value from an initial value to the alignment trigger value, wherein the alignment trigger value is greater than the initial value. In another embodiment, sequential modification of the count value in defined as decrementing the count value from an initial value to the alignment trigger value, wherein the alignment trigger value is less than the initial value. Also, in one embodiment, the associated clock signal is equivalent to a clock signal used to operate the initiator transceiver. When the counter indicates that the count value is equal to the alignment trigger value, an operation 405 is performed for transmitting an alignment signal in place of a transmission unit.

In one embodiment, the method also includes operating a comparator to compare the count value of the counter to the alignment trigger value. An output signal from the comparator is used as an indication of equality between the count value and the alignment trigger value. Also, a reset signal is transmitted to the counter when the count value is equal to the alignment trigger value. As suggested, the reset signal causes the counter to restart. Thus, the counter restarts each time the alignment signal is transmitted. In one embodiment, transmission of the alignment signal is delayed to accommodate a latency introduced by transmitting the reset signal and restarting the counter.

One skilled in the art will appreciate that the present invention can be defined on a semiconductor chip using logic gates configured to provide the functionality of the method as previously discussed. For example, a hardware description language (HDL) can be employed to synthesize hardware and a layout of the logic gates for providing the necessary functionality described herein.

Furthermore, with the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. An apparatus for controlling an alignment signal transmission in an electronic communication process, comprising:
    a counter configured to sequentially modify a count value in accordance with an associated clock signal, such that the count value is incremented by one upon each successive cycle of the clock signal, and wherein the counter includes a reset port, the counter configured to restart a counting operation from zero upon receipt of a signal at the reset port;
    a storage cell configured to receive and store an alignment trigger value;
    a comparator connected to receive the count value as an input from the counter and the alignment trigger value as an input from the storage cell, the comparator configured to compare the count value to the alignment trigger value, the comparator further configured to send an output signal from an output port upon equivalence of the count value and the alignment trigger value;
    alignment circuitry connected to receive the output signal from the comparator, the alignment circuitry configured to generate and transmit an alignment signal through an initiator transceiver to a target transceiver in response to receipt of the output signal from the comparator, wherein the alignment signal represents a dword that is not to be processed by internal logic of the target transceiver, and wherein receipt of the alignment signal by the target transceiver enables the target transceiver to catch up with processing of previously received non-alignment signal dwords; and
    a reset link defined to transmit the output signal from the comparator to the reset port of the counter, wherein the counter is configured to restart the counting operation upon receipt of the output signal at the reset port.

2. The apparatus for controlling an alignment signal transmission in the electronic communication process as recited in claim 1, further comprising:
    a user interface defined to enable setting of the alignment trigger value in the storage cell, wherein the alignment trigger value can be set to any integer value compatible with the storage cell configuration.

3. The apparatus for controlling an alignment signal transmission in the electronic communication process as recited in claim 1, wherein the alignment circuitry includes a delay circuit defined to delay transmission of the alignment signal to compensate for a latency associated with resetting the counter.

4. The apparatus for controlling an alignment signal transmission in the electronic communication process as recited in claim 1, wherein the clock signal associated with the counter is also associated with the initiator transceiver.

5. The apparatus for controlling an alignment signal transmission in the electronic communication process as recited in claim 1, wherein the alignment trigger value is defined to represent a number of transmission units to be transmitted between each alignment signal transmission.

6. The apparatus for controlling an alignment signal transmission in the electronic communication process as recited in claim 1, wherein the electronic communication process is performed in accordance with one of a Serial Attached SCSI (SAS) protocol and a Serial AT Attachment (SATA) protocol, the transmission unit is defined as a dword, and the alignment signal is defined as one of an ALIGN(0) primitive, an ALIGN(1) primitive, an ALIGN(2) primitive, an ALIGN(3) primitive, a NOTIFY(ENABLE SPINUP) primitive, a NOTIFY(RESERVED 0) primitive, a NOTIFY (RESERVED 1) primitive, a NOTIFY (RESERVED 2) primitive.

7. The apparatus for controlling an alignment signal transmission in the electronic communication process as recited in claim 6, wherein each of the initiator transceiver and the target transceiver is a defined as a phy.

8. A method for controlling alignment signal transmission in an electronic communication process, comprising:
    selecting an alignment trigger value;
    operating a counter to sequentially modify a count value in accordance with an associated clock signal, such that the count value is incremented by one upon each successive cycle of the clock signal;
    transmitting from an initiator transceiver to a target transceiver an alignment signal in place of a transmission unit when the count value is equal to the alignment trigger value, wherein the alignment signal represents a dword that is not to be processed by internal logic of the target transceiver, and wherein receipt of the alignment signal by the target transceiver enables the target transceiver to catch up with processing of previously received transmission units; and
    transmitting a reset signal to the counter when the count value is equal to the alignment trigger value, the reset signal causing the counter to reset the count value to zero.

9. The method for controlling alignment signal transmission in the electronic communication process as recited in claim 8, further comprising:
    providing a user interface to enable selection of the alignment trigger value.

10. The method for controlling alignment signal transmission in the electronic communication process as recited in claim 8, wherein the alignment trigger value can be any value necessary to ensure compatibility between the initiator transceiver and the target transceiver.

11. The method for controlling alignment signal transmission in the electronic communication process as recited in claim 8, further comprising:
    operating a comparator to compare the count value to the alignment trigger value.

12. The method for controlling alignment signal transmission in the electronic communication process as recited in claim 11, further comprising:
    using an output signal from the comparator to determine when the count value is equal to the alignment trigger value.

13. The method for controlling alignment signal transmission in the electronic communication process as recited in claim 8, wherein transmitting the alignment signal in place of the transmission unit is delayed to accommodate a latency introduced by transmitting the reset signal and causing the counter to restart.

14. The method for controlling alignment signal transmission in the electronic communication process as recited in claim 8, wherein the electronic communication process is performed in accordance with one of a Serial Attached SCSI (SAS) protocol and a Serial AT Attachment (SATA) protocol.

15. The method for controlling alignment signal transmission in the electronic communication process as recited in claim 14, wherein each of the initiator transceiver and the target transceiver is a phy.

16. A computer readable storage media containing program instructions for controlling alignment signal transmission in an electronic communication process, comprising:
  program instructions for selecting an alignment trigger value;
  program instructions for sequentially modifying a count value in accordance with an associated clock signal, such that the count value is incremented by one upon each successive cycle of the clock signal;
  program instructions for transmitting from an initiator transceiver to a target transceiver an alignment signal in place of a transmission unit when the count value is equal to the alignment trigger value, wherein the alignment signal represents a dword that is not to be processed by internal logic of the target transceiver, and wherein receipt of the alignment signal by the target transceiver enables the target transceiver to catch up with processing of previously received transmission units; and
  program instructions for resetting the count value to zero when the count value is equal to the alignment trigger value.

17. The computer readable storage media containing program instructions for controlling alignment signal transmission in the electronic communication process as recited in claim 16, further comprising:
  program instructions for providing a user interface to enable selection of the alignment trigger value.

18. The computer readable storage media containing program instructions for controlling alignment signal transmission in the electronic communication process as recited in claim 16, wherein the alignment trigger value can be any value necessary to ensure compatibility between the initiator transceiver and the target transceiver.

* * * * *